Figure 1:
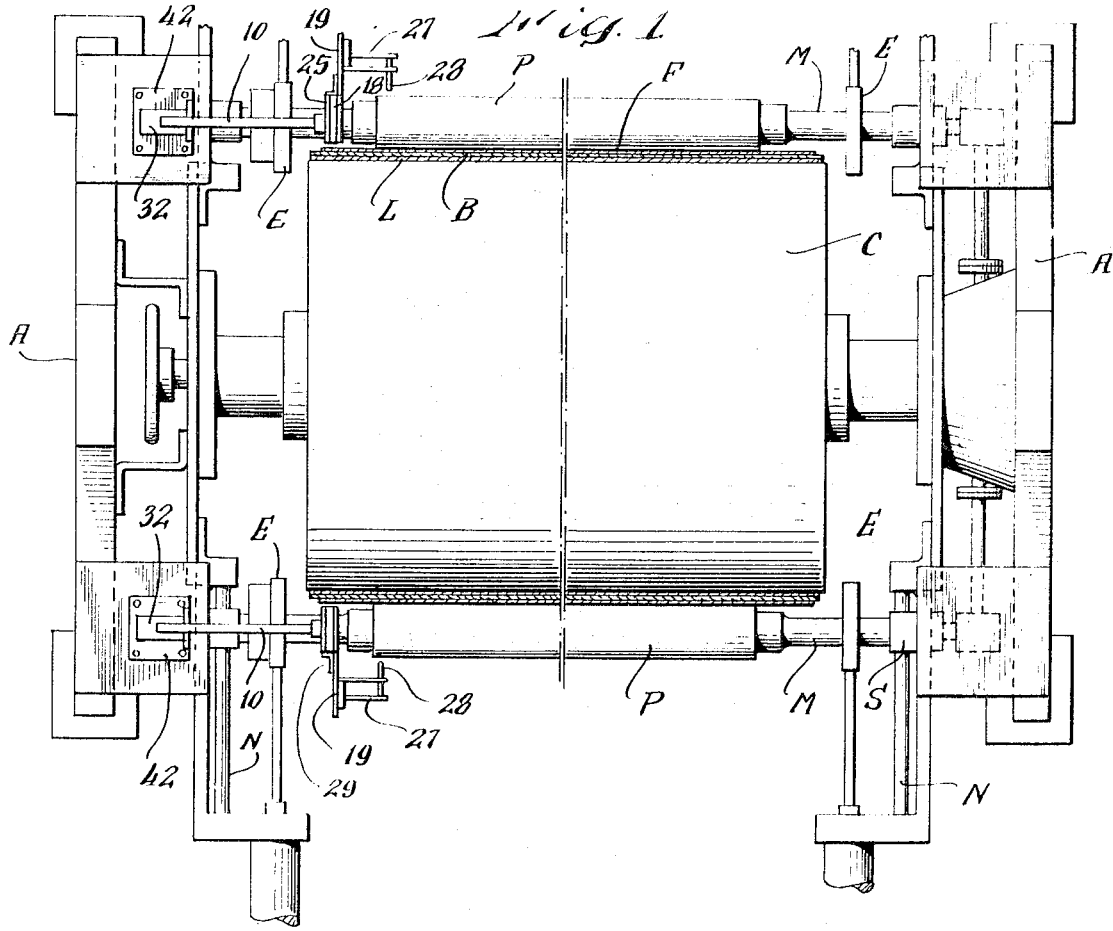

United States Patent
Johnson

[15] 3,662,472
[45] May 16, 1972

[54] TEMPLET FOR USE IN PLACING A SET OF PRINT ROLLS IN FIT

[72] Inventor: James Reid Johnson, Stonington, Conn.
[73] Assignee: The Johnson Fast Print Corporation, Brooklandville, Md.
[22] Filed: Feb. 3, 1969
[21] Appl. No.: 795,941

[52] U.S. Cl................................................33/184.5, 101/248
[51] Int. Cl..........................................................B41b 1/00
[58] Field of Search.................101/181, 183, 184, 180, 248; 33/182, 184.5

[56] References Cited

UNITED STATES PATENTS

| | | | |
|---|---|---|---|
| 1,231,479 | 6/1917 | Blumer | 101/178 X |
| 1,965,216 | 7/1934 | Brown | 33/184.5 |
| 3,077,668 | 2/1963 | Carter | 33/184.5 X |
| 3,160,094 | 12/1964 | Bean | 101/248 X |
| 3,182,590 | 5/1964 | Johnson | 101/248 |

Primary Examiner—William D. Martin, Jr.
Attorney—John W. Hoag

[57] ABSTRACT

For successively placing the print rolls of a set in a cloth printing machine comprising a number of print rolls spaced at even distances around a backing cylinder a templet is provided which has means at one end for attachment to the machine frame at positions spaced apart similarly to the spacing of the print rolls. At its other end the templet has an offset arm carrying a pointer with which to align a pitch mark on a roll being set in a fit. The pointer is mounted on a ring segment coaxially disposed with two coactive calibrated ring segments by the manipulation of which the correct rotary angle of the pointer for setting the print rolls successively at the correct rotary angles is indicated.

10 Claims, 12 Drawing Figures

INVENTOR.
James Reid Johnson

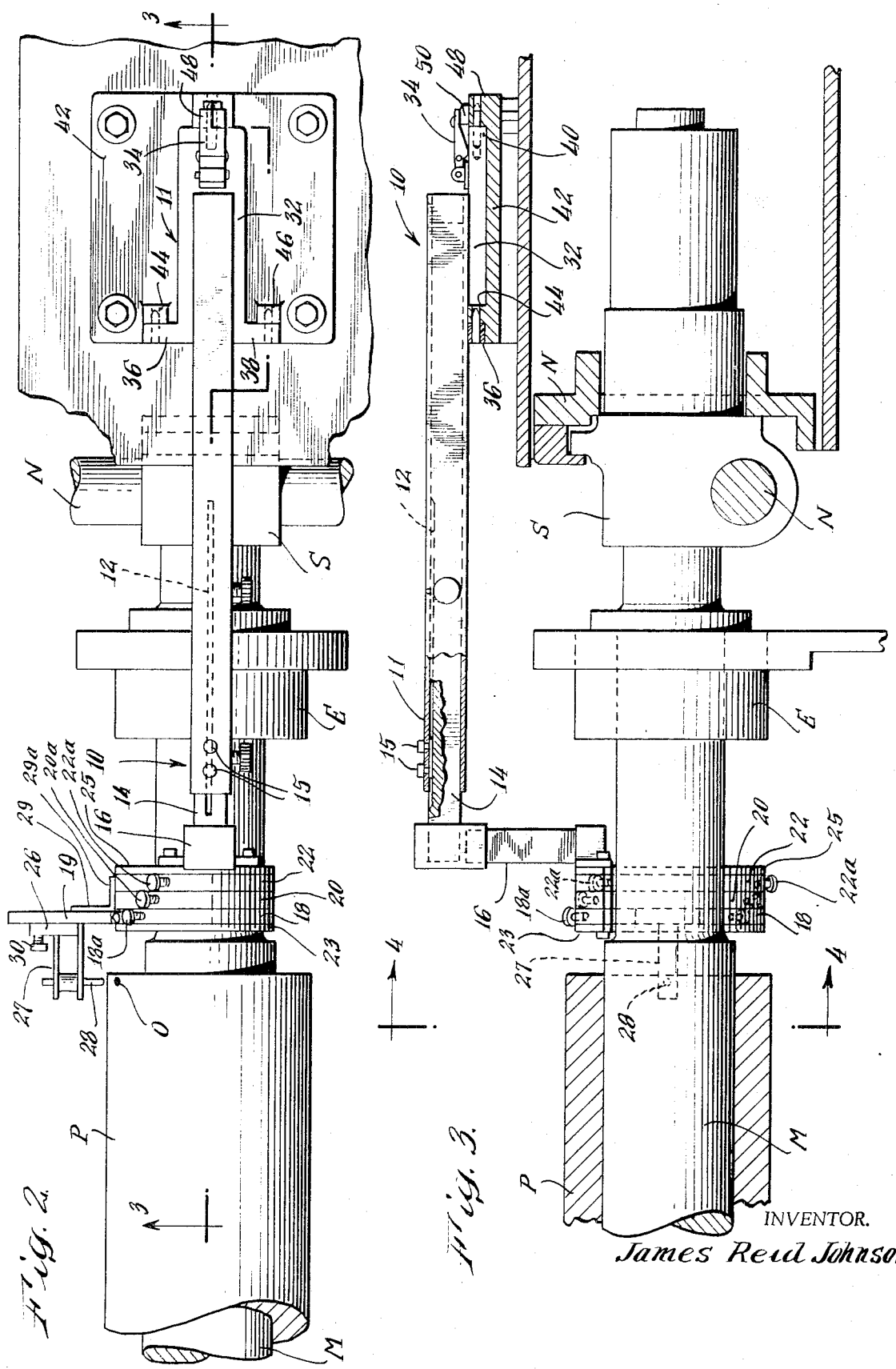

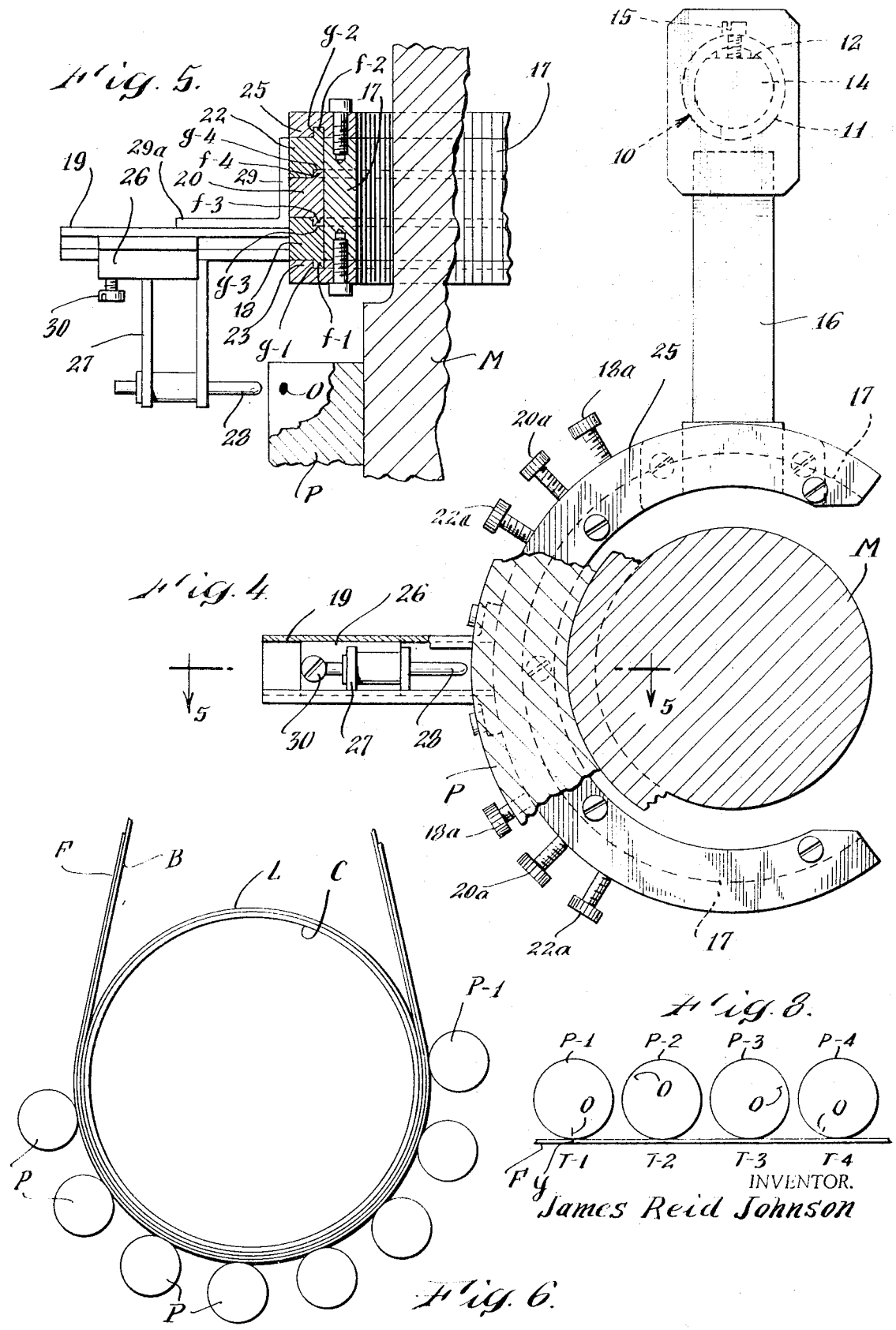

PATENTED MAY 16 1972 3,662,472

INVENTOR.
James Reid Johnson

TEMPLET FOR USE IN PLACING A SET OF PRINT ROLLS IN FIT

This invention relates to a templet or pitch mark gauge adapted to be interposed successively between corresponding ends of a set of rolls and the frame of the machine in which the print roll axles or mandrels are supported to serve as an indexing means by which to adjust the rotary angle of the rolls to place them in fit.

The templet may be used, for example, to place in fit a number of cloth printing rolls comprising a set so that each roll will successively print its portion of a composite pattern in proper relation to the other rolls, without overlapping or leaving undesired spaces between the parts. The rolls comprising a set of print rolls, with which use of the gauge is contemplated, are each marked on the periphery adjacent one end with a pitch mark indicating for example the beginning, or the middle, or the end, of the print pattern carried by that roll and forming a portion of a composite pattern to be printed by the whole set of rolls. These pitch marks are placed on the rolls by the engraver.

Without a satisfactory means for cooperating with the pitch marks to place the rolls of each set of rolls in fit when they are placed in a printing machine a great deal of valuable time is lost, and a very considerable amount of the material to be printed on is wasted in the process of placing the rolls in fit, one by one, by a trial and error process. The extent of resulting "down time" and loss of material will be more fully appreciated when it is understood that printing establishments will ordinarily have a large number of sets of print rolls, to print different patterns; and the rolls of one set may differ from the rolls of another set, in diameter, in length, and also in number. The number of rolls in a set will vary widely, and it is common to employ eight or more rolls in a single set. How often one set has to be removed from the machine and another set placed in the machine and brought into fit depends upon how much yardage is to be printed with any one design. If the runs are short the down time required for substitution of another set of print rolls to print a different design, and for rotary adjustment of the rolls of the substitute set, may be prohibitive.

In machines for printing running lengths of cloth, employing sets of print rolls, each set comprising a number of rolls, the print rolls are disposed around a backing cylinder, which is mounted for rotation between two spaced support standards, and supported between pairs of support arms, sometimes referred to as "nips," which are supported at one end by the cylinder support standards respectively and project radially from the support standards, the several pairs of support arms being spaced apart by constant rotary angles relative to the common backing cylinder. The result of this arrangement is that the distance between the contact points of print rolls and the cloth is the same as between each pair of nips. The axles on which the individual print rolls are supported usually take the form of spined mandrels, which engage keyways provided in the inner surfaces of the rolls. The ends of each mandrel are supported in aligned bearings which in turn are mounted for movement on their support arms to move the mandrel and a print roll thereon toward and away from the backing cylinder. When lapping is wound around the backing cylinder and a blanket is interposed between the backing cylinder and the web being printed, it will be understood that the print rolls are moved further away from the center of the backing cylinder along the radially disposed nips and are thus moved further apart.

The terms "axle" and "mandrel" are used herein interchangeably in referring to the means by which the rolls are mounted for rotation between pairs of bearings.

In order that sets of rolls of substantially different length may be employed, and in order to provide clearance for the various means such as color boxes and brushes which are associated with the print rolls, there is a considerable and variable distance between the ends of a set of print rolls and the bearings in which the print roll mandrels are respectively supported. In placing a set of print rolls in rotary fit the templet disclosed herein is used successively in connection with each roll and in each instance is disposed between the roll end and the opposed bearing defining portion of the frame, and the calibrated ring member are employed as will be described to determine the position of the pointer.

An object of this invention is to provide improved templets adapted to be interposed between a print roll end and the frame of the machine in which the print roll axle or mandrel is supported, to serve as indexing means with which to register a pitch mark on the print roll.

Another object of the invention is to provide a templet or gauge of the kind described having means cooperative with the support for one end of each mandrel to position the templet at exactly the same rotary angle relative to each support for the successive adjustment of all of the print rolls of a set.

Figure 7:
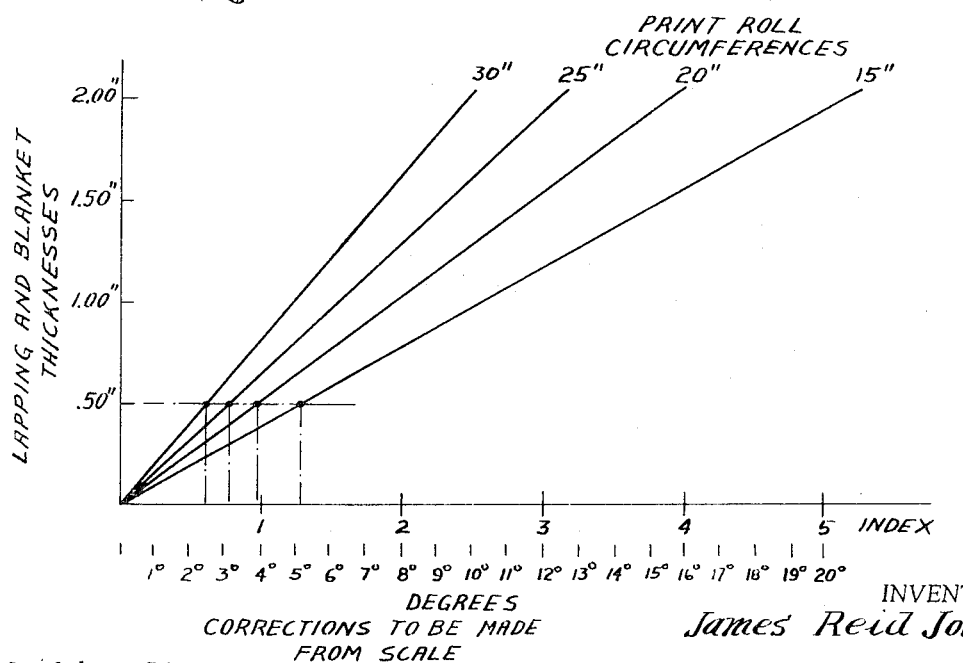
Figure 9:
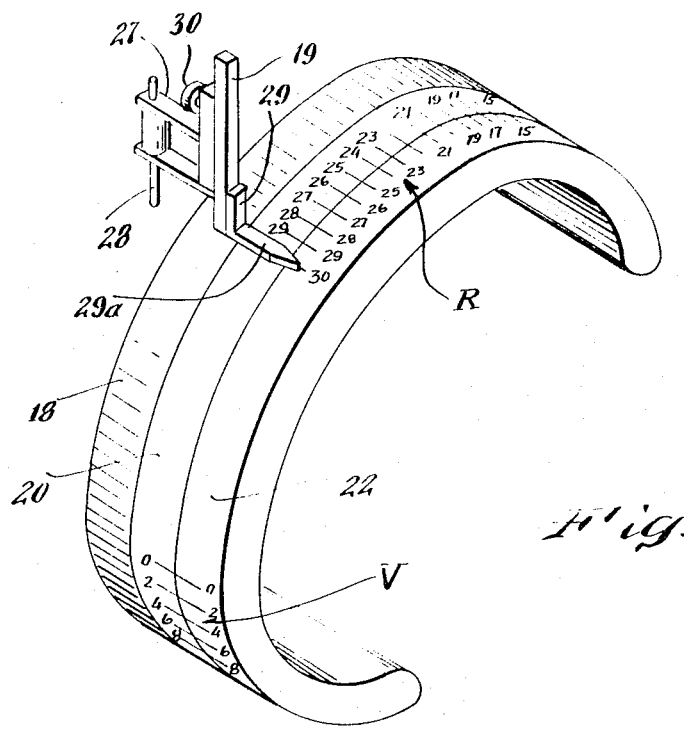
Figure 10:
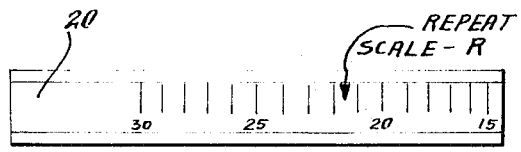
Figure 11:
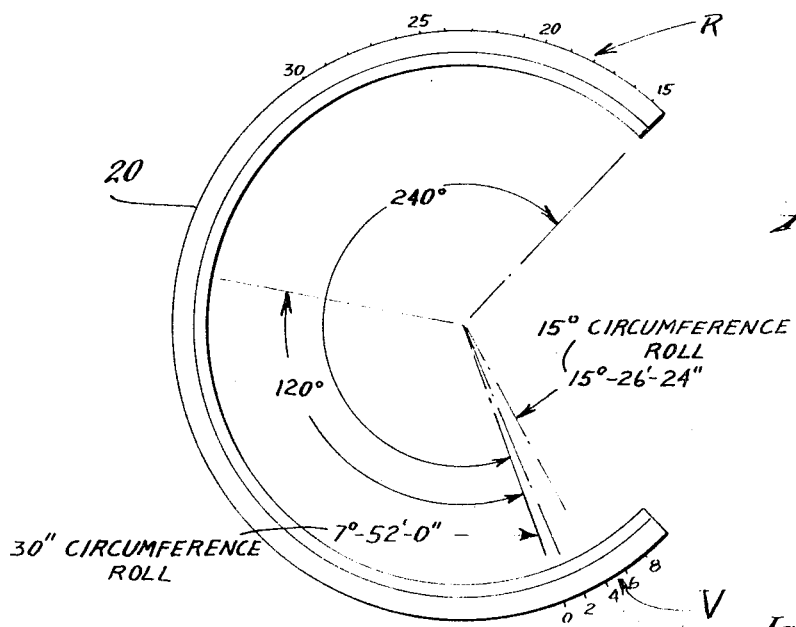
Figure 12:
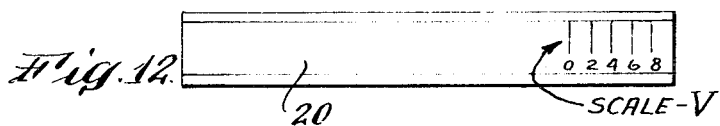

The invention will be best understood by reading the following description in connection with the drawings in which:

FIG. 1 is a top plan view of a cloth printing machine showing print rolls 1 and 8 of a set of eight print rolls disposed in operational relation to a backing cylinder which has extending around it a layer of lapping material, an endless blanket, and a sheet of material to be printed, with the templets or pitch mark gauges comprising this invention disposed over the ends of the print roll mandrels which are at the viewer's left hand, FIG. 2 is a top plan view of the templet showing its right hand end mounted on the print roll machine frame and extending in parallel relation to the print roll mandrel toward the adjacent end of a print roll mounted on that mandrel, FIG. 3 is a front elevation of the templet taken on the lines 3—3 of FIG. 2, FIG. 4 is a cross section taken on the lines 4—4 of FIG. 3, looking toward the assembly of rotatable ring segments which are carried by the longitudinal slide of the templet, FIG. 5 is a sectional view taken on the lines 5—5 of FIG. 4, showing how the rings are interrelated and retained on their semi-circular support, FIG. 6 is a schematic end view which should be read in connection with FIG. 1, showing the disposition of eight print rolls around a backing cylinder with the print rolls pressing against a length of cloth which extends over a printer's blanket which in turn is spaced from the surface of the cylinder by a thickness of lapping, FIG. 7 shows a chart on which a series of combined lapping and blanket thicknesses are plotted along the axis of ordinates line, against a series of "repeat" distance indicated by straight lines radiating from the zero point to give along the axis of abscissas line the correction which should be initially made in the zero position of the calibrated scales R of the templet in order to compensate for the variation in the combined thicknesses of the blanket and lapping, and FIG. 8 shows diagrammatically a number of print rolls spaced apart by even, repeat distances and the rotary angles at which the pitch marks 0 on a set of print rolls must be initially disposed in order for the set of print rolls to be in fit, FIG. 9 is a perspective view showing three ring segments with two of them similarly calibrated with scales R and V, FIG. 10 is a plan view looking down on the portion of ring 20 which is calibrated with the scale R, FIG. 11 is a side elevation of the ring segment assembly illustrating visually the increase in the angular distance between print rolls for rolls of different circumferences due to the lapping and the blanket; and indicating that the mark for 240° is a 15-inch repeat on calibrated scale R; and FIG. 12 is a plan view of ring 20 showing the vernier scale V thereon.

In the drawings a cloth printing machine is shown comprising eight print rolls P, arranged around a backing cylinder C with four print rolls in front of the cylinder and four more print rolls behind it. An endless blanket B extends around the cylinder and a length of cloth F to be printed is introduced between the blanket and the print rolls which are movable toward and away from the cylinder C on slides S which are mounted on slideways provided by pairs of supports or nips N which project radially from the standards A between which backing cylinder C is rotatably mounted. A sheet of fabric L such as cotton cloth, referred to as lapping, is provided around the backing cylinder C and beneath blanket B to give resilience to the surface of the blanket. The lapping sheets are frequently replaced and they vary in thickness.

After each print roll, comprising part of a set of print rolls which is to be used for printing a particular design, has been mounted in a pair of bearings E, supported by a pair of slides S, it is individually rotated as may be required to place it in fit with the other print rolls of the set so that each print roll will print successively within the same area on the cloth, and then the print rolls are pressed against the cloth and rotated to print the cloth with the desired design.

The templet which is the subject of this invention is used to set the angle between print rolls which will let all the rolls of a set, by their rotary motion, deliver their individual contributions to a composite design within a length of printing on the cloth equal to the distance between the print rolls. This angle differs in accordance with the diameter of the print rolls, being a greater angle for smaller diameters. It comprises a relatively long body portion which is mounted to extend parallel with the end of a mandrel M which projects from the print roll end which is adjacent the pitch mark 0 placed on the periphery of the print roll, the body portion being provided at one end with means for attachment to mounting means 42 on the machine frame. There is a mounting means 42 on the frame for each nip and the mounting means are spaced apart the same distances as the nips and are disposed in the same plane and equidistant from the periphery of the backing cylinder. The body portion defines a slideway extending to its other end to receive a slide the inner end of which is offset laterally and supports an assembly comprising three segments of rings one of which carries a pointer and two of which are calibrated, and all of which are rotatable to determine and indicate the different rotary angles for setting the print rolls of a set of print rolls.

As disclosed herein a body portion 10 has at one end means 11 for attachment to the machine frame and defines a slideway 12, open at its inner end and having therein the slide member 14, by which the effective length of the templet may be adjusted, as by set screws 15, in order to accomodate print rolls of different lengths. The end of the slide 14 which extends beyond the inner end of body portion 10 carries an arm 16 which extends at a right angle and at its outer end provides a support 17 which is a segment of a circle and extends more than 180° for rotatably mounting three ring segments 18,20 and 22 so that they can each be rotated through 360°.

As shown in FIG. 5 the ring segments 18, 20 and 22 are disposed between the flanges or side rals 23 and 25 of the support means 17 which on their inner surfaces have the grooves g–1 and g–2 to receive respectively a rib or key f–1 projecting laterally from the pointer ring segment 18 and a rib or key f–2 projecting laterally from the calibrated ring segment 22. On their inner surface ring segments 18 and 22 are similarly grooved at g–3 and g–4 to receive laterally extending projections or keys f–3 and f–4. It will be seen that in this manner all three of the ring segments are mated with one another and with the support said rails 23 and 25. The ring segments carry pairs of set screws 18a, 20a, and 22a by which they can be clamped to their support means.

Pointer ring 18 carries the radially extending double slideway 19 for a slide 26 having the laterally extending arm 27 from which extends the pointer 28, and a slide 29 which is aligned with pointer 28 and itself has the angular portion 29a which serves as an aid for reading the calibration on rings 20 and 22 and in aligning the pointer with the correct calibrations. By adjusting the position of slide 26 in its slideway 19, as by set screw 30, the position of pointer 28 may be adjusted to compensate for differences in the diameters of print rolls of different sets, and by adjusting the position of slide 14 in the body portion 10 the position of the pointer may be adjusted to receive print roll sets of different lengths.

Rings 20 and 22 are calibrated providing scales and by rotating one or both of these rings and then advancing the pointer ring 18 correspondingly the proper rotary position of the pointer for gauging the proper rotary position of the successive print rolls may be obtained. Rings 20 and 22 are each calibrated with two scales identified respectively as R and V.

Scale R is calibrated in repeat distances, and scale V is calibrated in degrees of angle to provide for corrections which must be made in the initial setting of ring segments 20 and 22 to compensate for variations in the circumferential length of the printing surface between print rolls due to variations in the combined thickness of the lapping L and the blanket B.

Different print rolls supply different portions of the design or apply different colors to different portions of it and the design is repeated over and over again along the length of cloth. The pitch mark 0 on each roll indicates where its contribution to the design begins. At the time a first print roll is starting to print within a design area the starting point on the following print roller will be at a different rotative angle from the starting point on the first roller, and will have to travel with the rotation of the second roll a distance equal to the travel of the cloth between print rolls in order to move into position for starting to print within the area within which the first print roll has just printed, and the angular position of the pitch marks must be adjusted to accomplish this. By inserting the print rolls in the machine with their respective pitch marks at the proper progressively greater rotary angles they will all print their portions of the design within a given area of the cloth and then repeat within successive areas.

In order to illustrate the relative rotary angles at which the print rolls of a set of rolls should be initially set this relation is shown in FIG. 8 where a number of print rolls are equally spaced along a horizontally travelling cloth. The points of contact or tangency of the rolls with the cloth have been identified as T–1, T–2, T–3 and T–4 respectively. These points are evenly spaced apart and the spacing distance is known when the thickness of the lapping plus blanket is determined. The point on the cloth which is at the point of contact or tangency with number 1 print roll is identified as y, and the pitch mark 0 on number one print roll is positioned opposite the point y on the cloth. The pitch mark on the number two print roll must be positioned so that the pitch mark on it will reach the cloth at exactly the same moment as point y on the cloth reaches T–2. At the time the pitch mark 0 on the number 1 print roll is contacting the cloth the pitch mark 0 on the number 2 print roll will be spaced from the cloth by an angle which will subtend an arc on the surface of print roll number 2 equal in length, measured around the surface of the print roll, to the linear distance between T–1 and T–2. Similarly the pitch mark 0 on the number 3 print roll will be spaced from the pitch mark 0 on the number 1 print roll by an angle which will subtend an arc on the surface of print roll number 3 equal in length to the linear distance T–1 to T–2 plus T–2 to T–3.

The angular distance around the circumference of a print roll which will equal to length of travel between print rolls (l.e. T–1 to T–2 or T–2 to T–3, etc.) varies with the circumference of the print roll. As the following examples show, this relationship is expressed as an equation as follows:

$$\text{angular distance} = \frac{\text{length of travel between any two print rolls}}{\text{circumference of the print rolls of a set}} \times 360°$$

For example, assuming that the length of travel between any two print rolls is 10 inches and the circumference of the print rolls is 15 inches, then the angle which will subtend an arc equal in length to the length of travel between any two print rolls would be $10/15 \times 360° = 240°$. If the circumference of the print roll is 30 inches then the angular distance would be $10/30 \times 360°$ 120°. These angular distances are marked on movable rings 20 and 22 on the templet but recorded in terms of print roll circumferences or repeats. By moving these rings the proper angular position of the pitchmarks on each roll of a set can be predetermined before setting up a pattern.

Scale V is provided for the zero setting on rings 20 and 22 to compensate for variation in the combined thickness of blanket B and the lapping L.

It will be understood that interposing a blanket B and lapping L between the surface of the backing cylinder C and cloth F will increase the distances between the cloth and the center of cylinder C and this increase the distance around the surface of the cloth. This affects the angle at which the pitch marks 0 on the second and succeeding print rolls must be set in order that the arc subtended by the angle will equal the length of cloth travel between any two print rolls, and variations in the combined thickness of blanket and lapping require corresponding changes in the angle at which the second and succeeding print rolls must be set.

In order for the templet to adjust for these variations a scale calibrated in angular distances is provided at the zero setting (the setting of print roll number 1) on rings 20 and 22 which will add to, or reduce, the angle distance determined as explained above. In order to understand this scale, and by way of example, assume that the nips N are 25° apart around the axis of a backing cylinder C which has a diameter of 45 inches and a circumference of 141.37 inches and that the length of cloth travel is 9.80 inches, and refer to the table set forth below which indicates the changes in repeat distances, and therefore in the angular positions of the pitch marks, resulting from the introducing of a blanket B and lapping L of different combined thicknesses.

| Blanket and Lapping thickness | Diameter of Cylinder | Circumference of Cylinder | Arc subtended by 25° angle | Increase in length of arc |
|---|---|---|---|---|
| inches | inches | inches | inches | inches |
| 0 | 45 | 141.37 | 9.80 | |
| ½ | 46 | 144.51 | 10.02 | .22 |
| 1 | 47 | 147.65 | 10.24 | .44 |
| 1½ | 48 | 150.80 | 10.46 | .66 |

The following examples illustrate how to find the angular change needed to modify the length of arc for any size of print roll circumference.
For a 15-inch circumference print roll:
one-half inch lapping 0.22 inches/15 × 360° = 5° — 16' inches angular change for one-half inch lapping
1½-inches lapping 0.66/15 inches × 360° = 15° — 26' — 24 inches angular change for 1½-inches lapping
For a 30-inch circumference print roll:
one-half inch lapping 0.22/30 × 360° = 2° — 38' — 24 inches
1½-inch lapping 0.66/30 × 360° = 7° — 52' — 00 inches The correction in the repeat distance may be read in each instance from the chart shown in FIG. 7 by finding the point along the ordinate line corresponding with the thickness of the lapping L employed and projecting this point across to the point on the line representing the size of the print roll, and projecting this point down to the abscissa or horizontal line.

From the above table and example equations it will be understood that the combined thickness of lapping and blanket increase the length of travel between print rolls of a set which are mounted on nips projecting radially from a backing cylinder by an amount which may be expressed by the following equation:

$$I = \frac{\pi(D=2T)}{A \div 360°} - \frac{\pi D}{A \div 360°}$$

Where
$D$ = the diameter of the backing cylinder
$T$ = the thickness of blanket and lapping
$A$ = the radial angle between nips $I$ increase in web travel between nips for blanket and lapping thickness
and that, having determined the value of $I$ the adjustment (increase) in the angular distances represented by the calibrations of the main scale due to the addition of the combined thickness of lapping and blanket may be expressed by the formula $$r = (I \times 360°/R)$$

Where
$r$ = radial adjustment (increase) represented by calibrations of vernier scale and
$R$ = repeat distance in inches.

The templet tool is disposed first with respect to print roll No. 1 and is attached to the mounting plate for the No. 1 nip. With the templet tool thus firmly positioned in parallel relation to the mandrel the ring segments will be disposed adjacent the end of print roll 1 which is marked with a pitch mark. The pointer on ring segment 18 is then moved into alignment with the reading on the zero scale V on ring segment 20 obtained from the predetermined chart and roll No. 1 will be moved axially and rotated to bring its pitch mark into alignment with the pointer.

For placing roll No. 2 in fit it is only necessary to rotate ring 18 to bring the pointer into alignment with the figure on the R scale of ring segment 20 which indicates the repeat distance for the set of print rolls being used. If the repeat distance is 16 ring 18 is simply moved to bring the pointer into alignment with the 16 on the R scale of ring 20.

For placing roll No. 3 in fit the zero on the V scale of ring 22 is now moved into alignment with the 16 on the R scale of ring segment 20 and then ring 18 is rotated to bring the pointer into alignment with the numeral 16 on ring segment 22.

For placing roll No. 4 in fit, move ring 20 of R scale to bring the zero mark thereon up to 16 on the R scale of ring 22. For placing roll No. 5 in fit move the zero on the R scale of ring 22 up to 16 on the R scale of ring 20. For additional print rolls keep adding the repeat distance to the rotary angle of the preceeding roll.

In employing the templet disclosed herein it may be successively mounted in any suitable way at each print roll position to extend between successive portions of the machine frame and the adjacent ends of successive print rolls, in parallel relation to the print roll mandrel and with the ring segment assembly partly encircling the mandrel. As shown herein the templet body 10 carries, at its end which in use is adjacent the frame, a flat plate 32 which extends below and beyond the end of member 10 and carries adjacent its outer end a latch 34 and has the raised lateral projections 36 and 38 which define dowel pin holes. Another dowel pin hole is provided in plate 32 at 40 adjacent its front end. On the machine frame, at each print roll position a dowel plate 42 is mounted which has on its surface lugs 44, 46 and 48 each defining a dowel pin hole. The templet is mounted successively on each of the dowel plates by placing the dowel hole defining portions of plate 32 against the lugs 44, 46 and 48 respectively on dowel plate 42 and inserting dowel pins through the combined dowel holes thus provided and by engaging the hook end of latch 34 over a keeper 50 provided on dowel plate 42.

There has thus been provided a templet which is easy to apply in different positions around a cloth printing machine, and by the use of which a set of print rolls may be placed in fit very quickly.

LIST OF PARTS

A Standards supporting C
B Blanket
C Backing cylinder
E Bearings for Mandrels
F Length of fabric (cloth)
L Lapping
M Mandrel
N Nips
O Pitch mark in P P Print roll
R Scale of "repeats"
S Slides
V Scale of Lapping and Blanket thickness adjustments
10 Templet body
11 Attachment means on end of 10
12 Slideway in 10
14 Slide in 12
15 Set screws for adjustment of 14 in 12
16 Arm extending at right angle from 14
17 Semi-circular support for 18, 20 and 22
18 Pointer ring segment
18a Set screws
19 Double slideway extending radially from 18
20 First calibrated ring segment
20a Set screws
22 Second calibrated ring segment
22a Set screws
23 Inner flange of 17
25 Outer flange of 17
f-1 Key on 18
f-2
f-3
f-4
g-1 groove in 23
g-2 groove in 25
g-3 groove in 18
g-4 groove in 22
26 Slide in 19
27 Arm projecting from 26
28 Pointer on 27
29 Slide in 19 opposite 26
29a Arm on 29 over scale
30 Set screw 30 for adjustment of 26 in 19
32 Flat plate on end of 10
34 Latch
36 Lateral part of plate 32 with dowel pin hole
38 Lateral part of plate 32 with dowel pin hole
40 Part of plate 32 with a third dowel pin opening
42 Dowel plate
44 Lugs
46 Lugs
48 Lugs
50 Helper on 42
T-1 Contact point between roll and cloth
T-2 Contact point between roll and cloth
T-3 Contact point between roll and cloth
T-4 Contact point between roll and cloth
y Point on cloth at T-1 and opposite 0 on print roll Number 1.

What I claim is:

1. A templet comprising a member having at one end means for attachment to a mounting means and having at its other end, a support which is a segment of a circle said support being disposed with its axis parallel to said member, a plurality of ring segments mounted for rotation on the support including a ring segment calibrated in terms of angles which subtend arcs equal in length measured around the circumference of a print roll to the distance between print rolls of a set, and a ring segment carrying a pointer and having indexing means for indexing the pointer in relation to the calibrations on the calibrated ring segment.

2. The templet claimed in claim 1 in which the axis of the segment of a circle support is parallel to the longitudinal axis of the member.

3. The templet claimed in claim 1 in which the member comprises a body portion defining a slideway and a slide adjustable in the slideway to extend the length of the member, and the attachment means is carried by the body portion and the segment of a circle support is carried at the free end of the slide.

4. The templet claimed in claim 3 in which the slide has a laterally extending arm at its free end and the segment of a circle support is carried by the arm in offset relation to said body portion.

5. The templet claimed in claim 1 in which the segment of a circle support has two side rails defining between them a slideway for the ring segments including means for retaining the ring segments within said slideway while permitting rotative movements of the ring segments relative to the support and relative to one another.

6. The templet claimed in claim 1 comprising, in addition to the pointer carrying ring segment, a plurality of ring segments similarly calibrated and adapted to provide additive readings for guaging successive rotary positions of the pointer.

7. The templet claimed in claim 1 in combination with a cloth printing machine comprising a backing cylinder and a number of print rolls disposed around the backing cylinder and supported in a frame having at spaced intervals, which correspond to the positions of the print rolls, mounting means adapted to coact with the attachment means of the templet to dispose the templet in parallel relation to a print roll mandrel and with the said ring segments extending partly around the mandrel adjacent the end of a print roll supported on the mandrel and having a pitch mark on its periphery for alignment with the pointer carried by the said pointer carrying ring segment.

8. A templet for use in placing in fit a set of print rolls disposed at equal distances around a backing cylinder, the templet being adapted to be interposed successively between each print roll end and the frame of the machine in which the print roll axles are supported and having means cooperative with the support for one end of each mandrel to position the templet at exactly the same rotary angle relative to each support, and comprising also, a segment of a circle support and a plurality of ring segments mounted for rotation around the support, at least one of the ring segments being calibrated in terms of angles which subtend arcs equal in length, when measured around the circumference of a print roll, to the length of travel between successive print rolls of a web being printed, and a ring segment carrying a pointer extending toward the end of the print roll and indexing means for aligning the pointer with calibrations on the calibrated ring segment.

9. A templet adapted to act as a guide in placing a set of print rolls in fit so that each print roll will print successively on a length of cloth within the same area of the cloth to define a composite pattern, each of the print rolls having on its surface a pitch mark indicating the beginning of the part of the pattern engraved on said roll, which comprises, a segment of a circle support and two or more ring segments mounted for rotary movement around said support, at least one of the ring segments being calibrated in terms of angles which will subtend an arc equal in length to the length of travel between any two of the print rolls, determined by the equation $$\text{angular distance} = \frac{\text{length of travel between any two print rolls}}{\text{circumference of the print rolls of a set}} \times 360°$$

and a ring segment having a pointer with which to align the pitch marks on the print rolls, and an indexing mark to be aligned with the zero mark on a calibrated ring for setting the first print roll, and to be aligned with other readings of the calibrated ring means positioned to express multiples of the said angular distances, for setting the other print rolls of the set.

10. The templet claimed in claim 9 in which the calibrated ring means carry another scale of calibrations for correcting the zero position of said calibrated ring means when a set of print rolls is spaced apart around the periphery of a backing cylinder which has a layer of lapping wrapped around it, and the cloth to be printed is passed, with, and on the outside of, a blanket, between the print rolls and the lapping wrapped backing cylinder, the additional calibrations being expressed in terms of angular distances to compensate for the increase in the arc length due to the increase in the spacing between the print rolls caused by the said addition to the circumference of the backing cylinder of the combined thicknesses of the lapping and the blanket.

* * * * *

UNITED STATES PATENT OFFICE
CERTIFICATE OF CORRECTION

Patent No. 3,662,472                  Dated  May 16, 1972

Inventor(s) James Reid Johnson

It is certified that error appears in the above-identified patent and that said Letters Patent are hereby corrected as shown below:

Column 2, line 48, "distance" should read -- distances -- . Column 4, line 74, "10/30 X 360° 120°" should read -- 10/30 X 360° = 120° -- . Column 5, line 10, before "increase", "this" should read -- thus -- ; line 48, "inch" should read -- " -- ; line 49, "one-half inch", "0.22 inches" and "16' ", should read -- one-half" -- ; -- 0.22" -- and -- 16' - 48", respectively; line 50, "inch" should read --"--; lines 51 and 52, "inches", each occurrence, should read -- " -- ; line 53, "inch" should read -- " -- ; line 54, "inch" and "inches" should read -- " -- ; line 55, "inch" and "inches" should read -- " -- .

Signed and sealed this 26th day of December 1972.

(SEAL)
Attest:

EDWARD M. FLETCHER, JR.                ROBERT GOTTSCHALK
Attesting Officer                      Commissioner of Patents